Oct. 9, 1928.
G. A. MITCHELL
1,687,030
ERECTING FINDER
Filed May 22, 1926
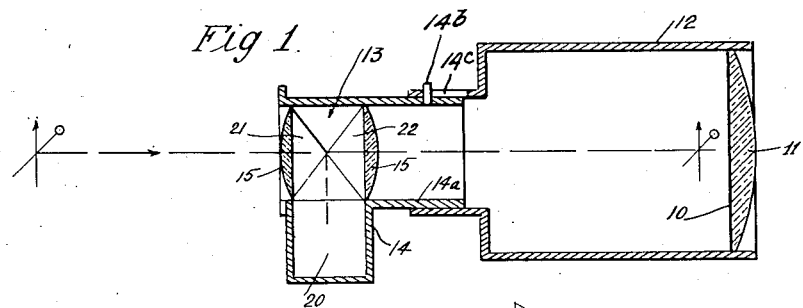
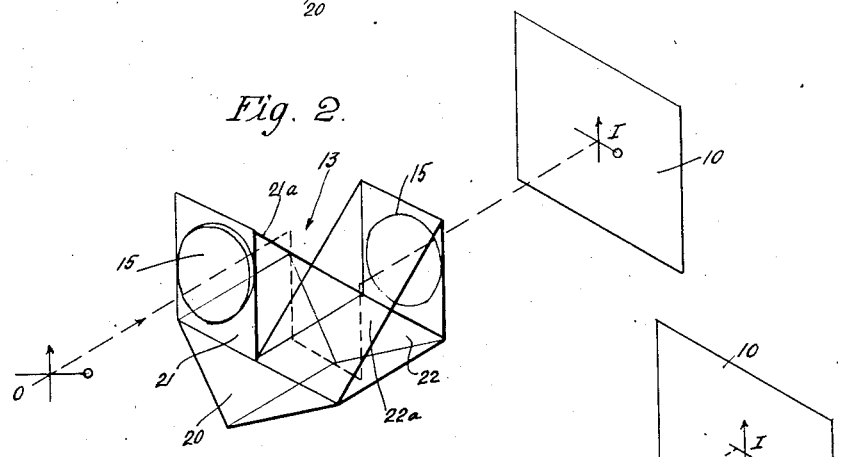
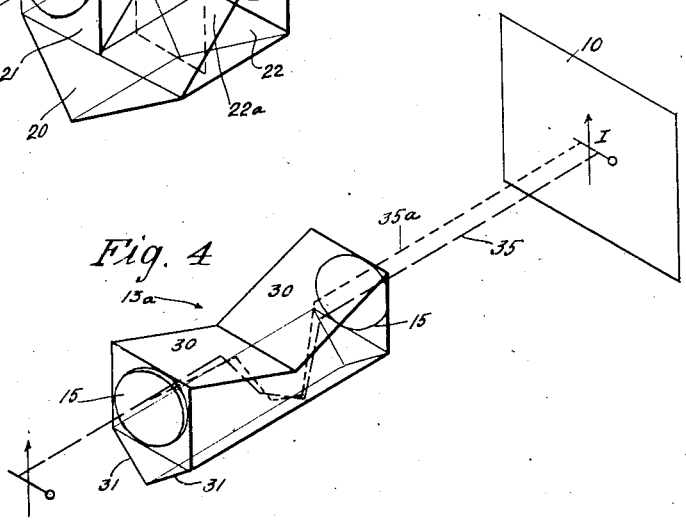
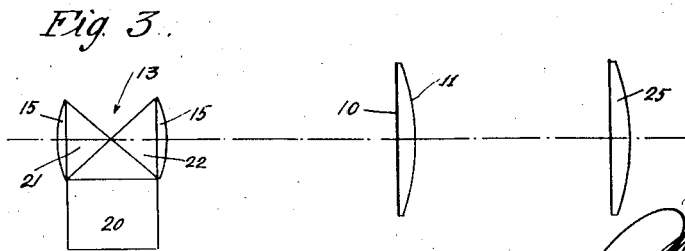
Inventor.
George A. Mitchell.
Attorney.

Patented Oct. 9, 1928.

1,687,030

UNITED STATES PATENT OFFICE.

GEORGE A. MITCHELL, OF LOS ANGELES, CALIFORNIA, ASSIGNOR TO MITCHELL CAMERA CORPORATION, A CORPORATION OF CALIFORNIA.

ERECTING FINDER.

Application filed May 22, 1926. Serial No. 110,866. REISSUED

This invention relates to finding instruments for cameras and the like. The invention is useful as a finding instrument in connection with other optical instruments, but as it has been particularly designed for use in connection with cameras it will be explained in that connection without, however, limiting the invention to such particular use.

Particularly in motion picture cameras an accurate and reliable finder is desired, as great accuracy is required in getting exactly the correct field of view on the film. It is also highly desirable that the image in the finding instrument be shown upright and in correct right and left relation, so as to avoid all possible confusion in the mind of the operator. An object of the present invention is to provide a simple form of finding instrument that will show the field of view without inversion or reversal and will show it of a size suitable for easy inspection. It is a further particular object to provide an optical structure simple and effective in itself for erecting the image, which would otherwise be inverted and transposed right for left by the ordinary objective lens of the finder.

Other objects and corresponding accomplishments of the invention will be better understood from a consideration of the following detailed description, reference for this purpose being had to the accompanying drawings, in which:

Fig. 1 is a more or less diagrammatic longitudinal section showing a finding instrument in accordance with my invention;

Fig. 2 is a diagrammatic perspective showing the same;

Fig. 3 is a diagram illustrating a somewhat modified form of said device; and

Fig. 4 is a diagrammatic perspective showing another modified form.

It will be understood, and particularly so from what I say hereinafter, that the specific and particular forms herein shown and described are intended merely to be typical and illustrative of my invention, and not specifically limitative thereof; the invention being only limited as is set forth in the appended claims.

Referring first to Fig. 1 I show at 10 a suitable translucent surface on which the image is received. This translucent surface may be any surface suitable for the purpose, many such being known in the art. Without intending any limitation, I shall here refer to it as a ground glass. Preferably I form this ground glass surface on the front face of a light collecting or slightly magnifying lens 11. This lens and its front image receiving face may be conveniently rectangular in shape, its proportions corresponding to the proportions of the picture being received in the camera to which the finding instrument is attached. The ground glass thus forms a frame showing the outlines of the image actually received in the camera.

The ground glass 10 may be mounted in any suitable tube or other housing 12, which also carries the erecting objective combination 13. This combination may be carried in a separate casing 14, and part 14$^a$ of which may be tubular in shape so that it may slide in the housing 12 to adjust the distance between the objective combination and the ground glass. It will be understood, however, that to adjust this focal distance it is only necessary to move the ground glass and the objective combination relatively, that either one may be moved with reference to the housing. To keep the objective combination always in one relative position (upright, as shown in the drawings), a pin 14$^b$ may play in a longitudinal slot 14$^c$ as shown in Fig. 1.

The objective combination comprises an objective made up of one or two lenses 15. For instance, the objective may be formed of two lenses 15 of suitable configuration to obtain an image of the size desired on ground glass 10; and the two lenses may be affixed, as by cementing, to the opposite plane faces of the prism structure of the objective combination, as is shown in the various views. It will also be well understood that a single lens could be used as an objective, but that use of double lenses is usually preferable in an objective for various well known reasons, and also for the reason that, in this case, the light beam through the prism structure is practically a parallel beam and the prisms therefore need only be of such size as to have reflecting faces substantially the same size as the lenses.

The function of the prisms in the objective combination is to erect and rectify the image finally thrown upon the ground glass. The form shown in Figs. 1, 2 and 3 consists of a right angled prism 20 to whose hypotenuse face are cemented two smaller right angle prisms 21 and 22 in the arrangement and relation best shown in Fig. 2. Supposing the object to be at 0, a light ray from the objective traverses the front lens 15, strikes the 45° face 21ª of prism 21 and is reflected downwardly to strike one of the 45° faces of prism 20 and hence to be reflected to the other 45° face of that prism and thence upwardly to strike the 45° face 22ª of prism 22 and thence rearwardly through the light lens 15 to ground glass 10. The reflection through the prism structure causes a complete reversal of the image from what it would be if it were transmitted by the lens alone; the result is that the image at I is in correct relative position, being correct as for right and left and being erect.

In Fig. 3 I show the same system but with the addition of a simple magnifying glass 25 behind ground glass 10, the real image on ground glass 10 being viewed through the magnifying glass. In this case the lens at 11 performs the function of a light collector for the magnifying glass 25, giving good illumination over the whole image.

In Fig. 4 I show an objective combination 13ª of a somewhat different specific type. Here the two lenses 15 are cemented to the flat front and rear faces of a prism of special form, this prism having two upper angular reflecting faces 30 and two lower angular reflecting faces 31. This form of erecting prism is known as the Brashear-Hastings erecting prism. Its function is substantially the same as the prismatic system shown in Fig. 2; and acting in combination with the lens 15 it obtains the same result as before described. In Fig. 4 the dash-line 35 shows how a ray would proceed through prism structure without lens 15, indicating how the image, without lens 15, would be inverted and reversed; and dotted-line 35ª shows how the same ray proceeds through the complete combination including the lenses, indicating that the image is erect and in correct position right for left.

There are other prismatic systems that may be used in connection with an objective lens for the purpose of rectifying and erecting the image; but I prefer to use a system of such physical proportions that it may be placed between the two lenses of the objective without separating those lenses too far to prevent their acting as a single objective lens. It is, of course, well known that several individual lenses of a complete objective lens may be designed so as to be separated somewhat from each other; and I make use of this possibility in my present design and separate the two lenses. These observations, of course, apply only to the use of an objective having two lens glasses. If a single lens glass is used, that single glass may be cemented to the front face of the prismatic system.

Also, for the purpose of this erecting objective combination, I prefer to use a prismatic system which has flat parallel front and rear faces so that the objective lens glasses may be cemented directly to those faces. By so doing I provide a simple, convenient and compact erecting lens combination with the prismatic system between the two lens glasses. In such a position, as will readily be understood, the prismatic system need not be very large, as the pencil of light passing between the two lens glasses of the objective is comparatively concentrated. The whole objective combination can thus conveniently be made of small size.

I claim:

1. In an erecting finder, an erecting objective combination comprising an erecting prismatic system having parallel flat front and rear faces, and an objective of two lenses, the lenses being cemented respectively to the front and rear faces of the prismatic system; and an image receiving surface from the objective combination and on which surface the objective throws its image.

2. In an erecting finder, an erecting objective combination comprising an erecting prismatic system having flat parallel front and rear faces each substantially at right angles to the optical axis of the system, and an objective lens comprising two lens glasses cemented respectively to said front and rear faces of the prismatic system, the two lens glasses of the objective acting as a single objective lens which would without the interposition of the prismatic erecting system throw an inverted and reversed image; and an image receiving surface spaced from the objective combination and on which surface the objective throws its image.

3. In an erecting finder, an erecting objective combination comprising an erecting prismatic system, and an objective of two lenses secured directly to the front and rear faces of the prismatic system; the lenses being of such focal lengths as to act as a single objective with a focal length that throws an image behind the rear lens; and an image receiving surface behind the rear lens.

4. In an erecting finder, an erecting objective combination comprising an erecting prismatic system, and an objective of two lenses secured directly to the front and rear faces of the prismatic system; the lenses being of such focal lengths as to act as a single objective with a focal length that throws an image behind the rear lens.

In witness that I claim the foregoing I have hereunto subscribed my name this 29 day of April, 1926.

GEORGE A. MITCHELL.